(12) United States Patent
Von Wrycza et al.

(10) Patent No.: US 9,184,819 B2
(45) Date of Patent: Nov. 10, 2015

(54) SELECTING ANTENNAS IN DOWNLINK COOPERATIVE SCHEDULING

(75) Inventors: Peter Von Wrycza, Stockholm (SE); Niklas Johansson, Uppsala (SE); Stefan Parkvall, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/389,037

(22) PCT Filed: Apr. 4, 2012

(86) PCT No.: PCT/SE2012/050368
§ 371 (c)(1),
(2), (4) Date: Sep. 29, 2014

(87) PCT Pub. No.: WO2013/151470
PCT Pub. Date: Oct. 10, 2013

(65) Prior Publication Data
US 2015/0063481 A1 Mar. 5, 2015

(51) Int. Cl.
*H04B 7/06* (2006.01)
*H04B 7/02* (2006.01)

(52) U.S. Cl.
CPC ............... *H04B 7/061* (2013.01); *H04B 7/024* (2013.01); *H04B 7/0691* (2013.01)

(58) Field of Classification Search
CPC .............. H04B 1/02; H04B 1/06; H04B 1/10; H07B 7/00; H07B 7/02; H07B 7/022; H07B 7/024; H07B 7/026; H07B 7/028; H07B 7/04; H07B 7/0404; H07B 7/0413; H07B 7/0417; H07B 7/0491; H07B 7/0495; H07B 7/0602; H07B 7/0608; H07B 7/061; H07B 7/0613; H07B 7/0619; H07B 7/0621; H07B 7/0623; H07B 7/0686; H07B 7/0691

USPC ......... 375/259, 267, 285, 295, 296, 299, 316, 375/346, 347
See application file for complete search history.

(56) References Cited

U.S. PATENT DOCUMENTS 5,852,630 A * 12/1998 Langberg et al. ............. 375/219
7,039,370 B2 * 5/2006 Laroia et al. .................. 455/101

(Continued)

FOREIGN PATENT DOCUMENTS

WO    WO 2012/108976 A1    8/2012

OTHER PUBLICATIONS

International Search Report, PCT Application No. PCT/SE2012/050368, Mar. 11, 2013.

(Continued)

*Primary Examiner* — Siu Lee
(74) *Attorney, Agent, or Firm* — Patent Portfolio Builders, PLLC (57) ABSTRACT

It is presented a method for obtaining a set of selected antennas in a mobile communication network, wherein each one of the selected antennas is intended to be used in data transmissions to a first mobile communication terminal. The method is performed in a network node of the mobile communication network and comprises candidate the steps of: obtaining a set of candidate antennas, wherein each one of the candidate antennas is arranged to send out the same cell identifier and at least some of the candidate antennas have different coverage areas; evaluating performance of at least a subset of the candidate antennas in relation to the first mobile communication terminal; and determining a set of selected antennas based on the performance of the candidate performance antennas having been evaluated. A corresponding network node, computer program and computer program product are also presented.

19 Claims, 3 Drawing Sheets

(56) References Cited

U.S. PATENT DOCUMENTS

| | | | |
|---|---|---|---|
| 7,139,527 B2* | 11/2006 | Tamaki et al. | 455/16 |
| 8,090,044 B2* | 1/2012 | Rofougaran | 375/267 |
| 8,340,115 B2* | 12/2012 | Waxman | 370/437 |
| 8,520,625 B2* | 8/2013 | Ghassemzadeh et al. | 370/329 |
| 8,565,785 B2* | 10/2013 | Lee et al. | 455/456.1 |
| 8,780,753 B2* | 7/2014 | Zirwas et al. | 370/252 |
| 8,792,924 B2* | 7/2014 | Xiao et al. | 455/515 |
| 2011/0080879 A1* | 4/2011 | Grant | 370/329 |
| 2012/0028673 A1* | 2/2012 | Jeong | 455/522 |
| 2012/0207043 A1 | 8/2012 | Geirhofer et al. | |
| 2012/0208547 A1 | 8/2012 | Geirhofer et al. | |
| 2012/0208581 A1* | 8/2012 | Ishida et al. | 455/509 |

OTHER PUBLICATIONS

Written Opinion of the International Searching Authority, PCT Application No. PCT/SE2012/050368, Mar. 11, 2013.

Huawei et al., "CoMP clarification of definitions and TP", 3GPP TSG RAN WG1#54 bis, R1-083906, Prague, Czech Republic, Sep. 29-Oct. 3, 2008, 6 pp.

Tokyo Institute of Technology et al., Distributed Dynamic CoMP for LTE-Advanced (Revision from R1-093608), 3GPP TSG Ran WG1 Meeting #58B, R1-094285, Miyazaki, Japan, Oct. 12-16, 2009, 21pp.

Potevio, "Considerations for RRH subset selection mechanism", 3GPP TSG RAN WG1 Meeting #66bis, R1-113035, ZhuHai, China, Oct. 10-14, 2011, 3 pp.

New Postcom, "The functional partition of CoMP Measurement Set and RRM Measurement Set", 3GPP TSG RAN WG1 Meeting #68, R1-12xxxx, Dresden, Germany, Feb. 6-10, 2012, 4 pp.

* cited by examiner

SELECTING ANTENNAS IN DOWNLINK COOPERATIVE SCHEDULING

CROSS REFERENCE TO RELATED APPLICATION

This application is a 35 U.S.C. §371 national stage application of PCT International Application No. PCT/SE2012/050368, filed on 4 Apr. 2012, the disclosure and content of which is incorporated by reference herein in its entirety. The above-referenced PCT International Application was published in the English language as International Publication No. WO 2013/151470 A1 on 10 Oct. 2013.

TECHNICAL FIELD

Embodiments presented herein relate to data transmissions to a mobile communication terminal.

BACKGROUND

In mobile communication networks, there is always a challenge to obtain good performance and capacity for a give set of hardware. To increase capacity, additional cells can be introduced and a dense infrastructure may be needed to enable high data rates. However, the user distribution is typically non-uniform and this approach may is not always suitable.

It is desired to find a way to balance coverage with capacity where interference between channels for different mobile communication terminals is reduced.

SUMMARY

An object of embodiments herein is to provide reduced interference from transmissions to a mobile communication terminal.

According to one aspect, is presented a method for obtaining a set of selected antennas in a mobile communication network, wherein each one of the selected antennas is intended to be used in data transmissions to a first mobile communication terminal. The method is performed in a network node of the mobile communication network and comprises the steps of: obtaining a set of candidate antennas, wherein each one of the candidate antennas is arranged to send out the same cell identifier and at least some of the candidate antennas have different coverage areas; evaluating performance of at least a subset of the candidate antennas in relation to the first mobile communication terminal; and determining a set of selected antennas based on the performance of the candidate antennas having been evaluated.

By actively selecting what antennas are to be used in data transmissions to the first mobile communication terminal, poor performance antennas can be omitted. This reduces the power used in the network as a whole for transmission to the first mobile communication terminal, whereby interference is reduced.

In the step of obtaining, at least some of the candidate antennas may be located at different sites. By considering candidate antennas at different sites, candidate antennas being located far away from the first mobile communication terminal could e.g. be omitted.

The candidate antennas may be part of a shared cell comprising a subcell of a first type and subcells of a second type, wherein a coverage of at least one subcell of the second type is completely included in a coverage of the subcell of the first type. Using a shared cell general coverage can be provided with the first type of cell while local areas of increased capacity can be provided with the second type of subcell, while the mobile communication terminal still perceives the subcells as a single cell.

The subcell of the first type may be a macrocell and the subcells of the second type may be picocells.

The step of evaluating performance may comprise, for antenna groups each comprising one or more of the candidate antennas, the substeps of:

transmitting data using the respective candidate antennas of the antenna group, for one antenna group at a time; and determining a performance related to the transmitted data. By using transmission of data and evaluating actual performance of the transmission, a real world measurement of performance can be achieved for the one or more antennas being evaluated. The antenna groups do not need to be mutually exclusive, i.e. a candidate antenna which is part of one antenna group can be part of another antenna group. In one embodiment, all antenna groups contain the antennas of the subcell of the first type, e.g. a macrocell.

The step of evaluating performance may comprise evaluating any acknowledgement (ACK) or non-acknowledgement (NACK) signals, related to the transmitted data, received from the first mobile communication terminal. These are signals, which are typically already available, which reduce or eliminate the need for additional signalling to perform the evaluation.

The step of evaluating performance may comprise calculating a block error rate using the acknowledgement or non-acknowledgement signals.

The step of evaluating performance may comprise determining a low performance when a number of non-acknowledgements are received, and determining a high performance when a number of acknowledgements are received.

The step of evaluating performance may comprise evaluating a performance of other mobile communication terminals. The selection of what antennas to be used may also affect the performance of other mobile communication terminals. It is beneficial to evaluate performance of these other mobile communication terminals also, to thereby increase performance of the system as a whole.

The step of obtaining a set of candidate antennas may comprise including antennas of a first type of subcell having coverage including the first mobile communication terminal. The obtaining candidate antennas will thus ensure that the larger first type of subcell serving the first mobile communication terminal is included in the set of candidate antennas.

In the step of evaluating performance, the at least a subset of the candidate antennas may comprise all of the candidate antennas. This will allow all of the candidate antennas to be evaluated, either as part of a subset of antennas or individually.

In the step of determining, the set of selected antennas may always contain any antennas associated with the subcell of the first type, when the subcell of the first type has a coverage which includes the first mobile communication terminal. In other words, any antennas of the first type of subcell, providing general coverage, are in this way always included to ensure good coverage for the first mobile communication terminal, even if the terminal is moving in or out of local subcells related to the second type of subcell.

The step of obtaining a set of candidate antennas may comprise selecting any antennas receiving an uplink signal from the first mobile communication terminal, the uplink signal having a signal power over a threshold value. In other words, antennas which do not receive a sufficiently strong uplink signal are omitted, since if these are unlikely to provide a sufficiently strong downlink signal to the first mobile communication terminal.

The step of obtaining a set of candidate antennas may comprise determining a location of the first mobile communication terminal and selecting candidate antennas based on the location of the antennas in relation to the location of the first mobile communication terminal. In this way, antennas which are known to be far away from the first mobile communication terminal can be omitted from the set of candidate antennas.

The set of selected antennas may be a strict subset of the set of candidate antennas. In other words, some antennas are omitted for transmission to the first mobile communication terminal, whereby interference is reduced.

The method may further comprise the step of: transmitting data to the first mobile communication terminal using only the selected set of antennas.

According to a second aspect, it is presented a network node for obtaining a set of selected antennas in a mobile communication network, each one of the selected antennas are intended to be used in data transmissions to a first mobile communication terminal. The network node comprises: a candidate set obtainer arranged to obtain a set of candidate antennas wherein each one of the candidate antennas is arranged to send out the same cell identifier and at least some of the candidate antennas have different coverage areas; a performance evaluator arranged to evaluate performance of at least a subset of the candidate antennas in relation to the first mobile communication terminal; and a selected antenna set determiner arranged to determine a set of selected antennas based on the performance of the candidate antennas having been evaluated.

The candidate set obtainer may be arranged to obtain a set of candidate antennas of which at least some are located at different sites.

The candidate antennas may be part of a shared cell comprising a subcell of a first type and subcells of a second type, wherein a coverage of at least one subcell of the second type is completely included in a coverage of the subcell of the first type.

The network node may be a radio base station.

The network node may be a radio network controller.

According to a third aspect, it is presented a computer program for obtaining a set of selected antennas in a mobile communication network, wherein each one of the selected antennas is intended to be used in data transmissions to a first mobile communication terminal. The computer program comprises computer program code which, when run on a network node, causes the network node to: obtain a set of candidate antennas, wherein each one of the candidate antennas is arranged to send out a the same cell identifier and at least some of the candidate antennas have different coverage areas; evaluate performance of at least a subset of the candidate antennas in relation to the first mobile communication terminal; and determine a set of selected antennas based on the performance of the candidate antennas having been evaluated.

According to a fourth aspect, it is presented a computer program product comprising a computer program according to the third aspect and a computer readable means on which the computer program is stored.

It is to be noted that any feature of the first, second, third and fourth aspects may be applied to any other aspect, wherever appropriate.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
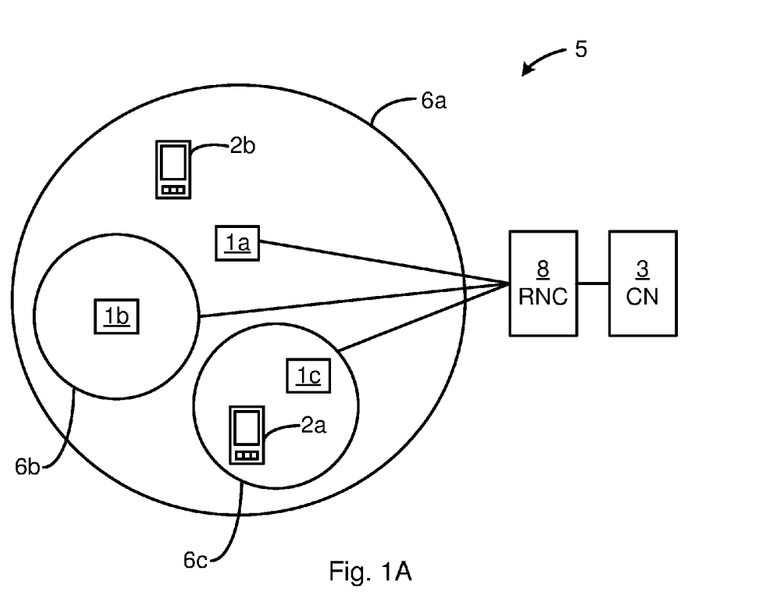
FIGS. 1A-B are schematic diagrams illustrating some variants of a mobile communication network where embodiments presented herein can be applied.

FIG. 1A is a schematic diagram illustrating a mobile communication network 5 where embodiments presented herein can be applied. The mobile communications network 5 comprises a core network 3 and one or more radio base stations 1a-c, here in the form of Node Bs 1, also known as Node Bs or NBs. The radio base stations 1a-c could also be in the form of evolved Node Bs, BTSs (Base Transceiver Stations) and/or BSSs (Base Station Subsystems). The radio base stations 1a-c provide radio connectivity to a plurality of mobile communication terminals 2a-b. The term mobile communication terminal is also known as user equipment, mobile terminal, user terminal, user agent, etc.

The mobile communication network 5 can e.g. comply with any one or a combination of W-CDMA (Wideband Code Division Multiplex), LTE (Long Term Evolution), EDGE (Enhanced Data Rates for GSM Evolution, GPRS (General Packet Radio Service)), CDMA2000 (Code Division Multiple Access 2000), etc., as long as the principles described hereinafter are applicable.

The communication between each one of the mobile communication terminals 2a-b and the radio base stations 1a-c occurs over a wireless radio interface.

Each radio base station 1a-c provides coverage using a corresponding cell 6a-c. In this example, the three cells 6a-c make up a shared cell, whereby each single cell 6a-c of the shared cell are denoted subcells. Being a shared cell, the same cell identifier is used for transmissions from the antennas of all three radio base stations 1a-c. From the perspective of the mobile communication terminal, this means that the all the cells 6a-c appear like one cell. The first cell 6a of the first radio base station 6a is a larger cell of a first type of cell and the second and third cells 6b-c of the second and third radio base stations 1b-c, respectively, are smaller cells of a second type. For example, the first cell 6a can be a macrocell and the second and third cells can be picocells (nanocells, femtocells, or a combination of these, etc.).

In this embodiment, both the second and third subcells 6b-c are completely contained within the first subcell 6a. Optionally, one or more of the smaller cells 6b-c can be partly contained (not shown) in the first subcell or even without any overlap, as long as they use the same cell identifier.

The first mobile communication terminal 2a is within the coverage areas of the third cell 6c and the first cell 6a. Hence, in communication to the first mobile communication terminal 2a, it would be beneficial to at least not use the antennas of the second radio base station 1b, since such transmissions would in any case not reach the first mobile communication terminal 2a. The second mobile communication terminal 2b is only within the coverage area of the first cell 6a, whereby the antennas of the second and third radio base stations 1b-c could be not utilised for transmission to the second mobile communication terminal 2b. This selection of antennas to be used in data transmissions to a particular mobile communication terminal is described in more detail below with reference to FIGS. 3A and 3B.

The radio base stations 1a-c are optionally controlled by a radio controller node (RNC) 8. The radio base stations 1a-c are also connected, via the RNC 8 if there is one provided, to a core network 3 for connectivity to central functions and other networks.

Figure 1B:
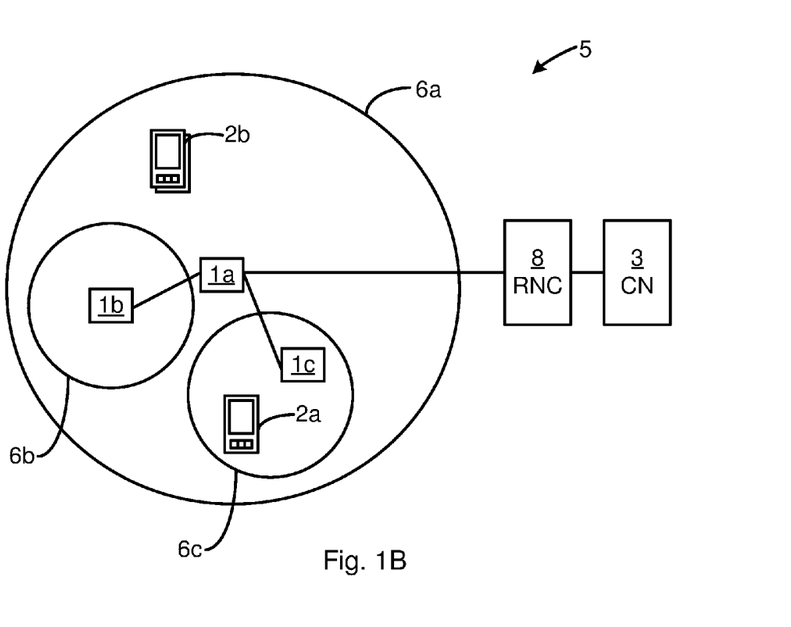

The mobile communication network 5 of FIG. 1B is equivalent to the mobile communication network of FIG. 1A. One difference is that the larger first radio base station 1a here controls the smaller second and third radio base stations 1b-c.

Figure 2A:
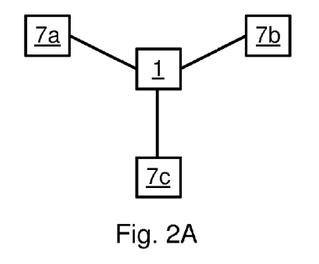
FIG. 2A is a schematic diagram illustrating the use of remote radio units in a radio base station of FIGS. 1A-B.

FIG. 2A is a schematic diagram illustrating the use of remote radio units in a radio base station of FIGS. 1A-B. It is here shown a radio base station 1, such as one or more of the radio base stations 1a-c of FIGS. 1A-B. The radio base station 1 is connected to three remote radio units 7a-c. The remote radio units 7a-c each comprise one or more antennas, and circuitry to allow connection to the radio base station 1. For example, each remote radio unit 7a-c may contain AD/DA (Analogue Digital/Digital Analogue) converters and other analogue and/or digital circuitry.

Using the remote radio units 7a-c, the radio base station 1 is able to control antennas at different sites, to thereby control the coverage area under the control of the radio base station 1. In one embodiment, remote radio units can be used to provide a structure such as the one shown in FIG. 1B, where remote radio units replace the second and third radio base stations 1b-c.

While the radio base station 1 is shown to be connected to three remote radio units 7a-c in FIG. 2A, the radio base station 1 can be connected to any suitable number of remote radio units, such as one, two or more.

Figure 2B:
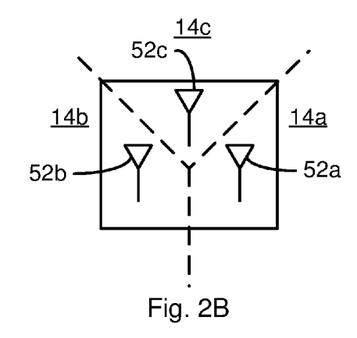
FIG. 2B is a schematic diagram illustrating the use of sectors in a radio base station of FIGS. 1A-B.

FIG. 2B is a schematic diagram illustrating the use of sectors in a radio base station of FIGS. 1A-B. It is here shown a radio base station 1, such as one or more of the radio base stations 1a-c of FIGS. 1A-B. The radio base station 1 here comprises three sets of antennas 52a-c, where each set of antenna 52a-c can comprise one, two or more antennas. Each one of the set of antennas 52a-c is directed so as to correspond to a respective sector 14a-c. Each sector provides a separate coverage area. The coverage area of one sector can optionally partly overlap the coverage area of another sector.

While the radio base station 1 is shown to be connected to provide three sectors 14a-c in FIG. 2B, the radio base station 1 can provide any suitable number of sectors, such as one, two or more.

Figure 3A:
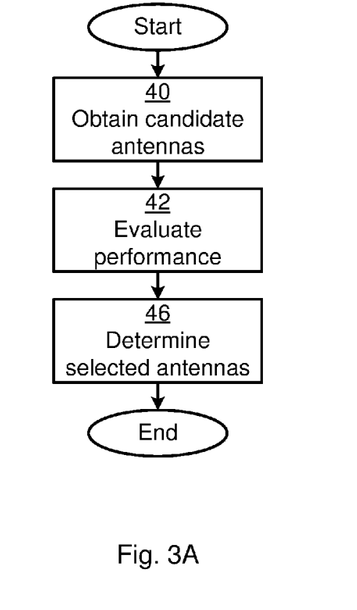
FIGS. 3A-B are flow charts illustrating embodiments of methods for determining a resource allocation between downlink and uplink for use in the radio interface of FIGS. 1A-B.

FIG. 3A is a flow chart illustrating an embodiment of a method for obtaining a set of selected antennas in a mobile communication network, such as the mobile communication network 5 of FIGS. 1A-B.

The method is performed in a network node of the mobile communication network, such as the first radio base station 1a or the radio network controller 8 of FIGS. 1A-B. In the description below, the method is performed for a particular mobile communication terminal denoted the first mobile communication terminal. However, it is to be understood that the method can also be performed, in parallel and/or serially, for other mobile communication terminals for a part of or an entire mobile communication network 5.

In an initial obtain candidate antennas step 40, a set of candidate antennas is obtained. Each one of the candidate antennas is arranged to send out a pilot signal comprising the same cell identifier. At least some of the candidate antennas have different coverage areas. In one embodiment, the different coverage areas correspond to different subcells of a shared cell, such as is shown in FIGS. 1A-B.

In one embodiment, the different coverage areas correspond to different sectors, such as is shown in FIG. 2B.

Looking again at the situation of FIG. 1A, it can be worth including the antennas of the smaller, first type, of subcell 6c which comprises the first mobile communication terminal 2a in the set of candidate antennas.

In other words, the selection of candidate antennas can be based on knowledge about the location of the first mobile communication terminal, possibly also based on known or predicted movement behaviour of the first mobile communication terminal. For example, if the first mobile communication terminal is located close to a particular antenna, or if the radio propagation conditions are known to result in a strong signal when received at the location of the first mobile communication terminal, then that particular antenna is included in the set of candidate antennas.

This selection of candidate antennas can thus comprise determining a location of the first mobile communication terminal and selecting candidate antennas based on the location of the antennas in relation to the location of the first mobile communication terminal.

Optionally, the obtaining a set of candidate antennas comprises selecting any antennas receiving an uplink signal from the first mobile communication terminal, where the uplink signal has a signal power which is over a threshold value. In this way, antennas which are too far away from the first mobile communication terminal to receive a sufficiently strong uplink signal are omitted.

Optionally, the decision of what antennas to include in the set of candidate antennas can be based on a-priori knowledge of the geographical location of the antennas. For example, if one antenna is not included in the set of candidate antennas because its measured uplink received power is low, an antenna having a different geographical location is more probable to be included in the set of candidate antennas. Another example is when antennas positioned on a certain floor or in a certain room inside a building are included in the candidate set, then antennas positioned on a different floor or in a different room that is more isolated (in terms of radio propagation) are less probable to be included in the candidate set.

Optionally, the decision of what antennas to include in the set of candidate antennas can be based on the success or failure of previous transmission from the antenna to the first mobile communication terminal considered. For example, if the preceding transmission used a subset of antennas in the cell and the transmission was successful (the data was successfully decoded to a high degree), then this subset of antennas could be included in the set of candidate antennas for subsequent transmissions.

Optionally, regardless of any other selections, the antenna(s) of a larger, first type, of subcell having coverage of the mobile communication terminal (e.g. macrocell) is always included in the set of candidate antennas.

Optionally, the set of candidate antennas can contain the antennas related with all subcells of an entire shared cell.

In an evaluate performance step 42, the performance of at least some of the candidate antennas is evaluated in relation to the mobile communication terminal. Performance in this respect is to be interpreted as impact on user and/or system throughput, capacity, power consumption, or combinations of these. Optionally, all candidate antennas are evaluated.

The performance evaluation can optionally include evaluating acknowledgements (ACKs) and/or non-acknowledgement (NACKs) signals related to the transmitted data received from the first mobile communication terminal. A relatively low performance can then be determined when a number of NACKs are received, and a relatively high performance can then be determined when a number of ACKs are received. For example, a block error rate (BLER) can be calculated using ACKs and/or NACKs received. The block error rate (BLER) can then be used as a performance measurement.

If we consider the situation in FIG. 1A, where a set of selected antennas should be determined for the first mobile communication terminal 2a, the performance in relation to the first mobile communication terminal 2a can also involve other mobile communication terminals 2b. If, for instance, one of the other mobile communication terminals is located between the borders of the second and third subcells 6b-c, the selection to use the antennas of the second and third radio base stations 1b and 1c can create interference for that mobile communication terminal. In other words, selecting the antennas of the third base station 1c would have a positive performance contribution for the first mobile communication terminal 2a, but may have negative performance contribution for other mobile communication terminals. The evaluation related to the first mobile communication terminal may thus optionally comprise considering the performance of other mobile communication terminals.

In a determine selected antennas step 46, a set of selected antennas is determined based on the performance of the candidate antennas having been evaluated. The set of selected antennas comprises at least one antenna.

Optionally, the antenna(s) of a larger, first type, of subcell having coverage of the mobile communication terminal (e.g. macrocell) is always included in the set of selected antennas. In this way, a large coverage in the shared cell is ensured for the first mobile communication terminal.

Optionally, the set of selected antennas is a strict subset of the set of candidate antennas. In other words, the step of determining selected antennas includes omitting one or more of antennas from the set of candidate antennas. In this way, a focus on the best antennas in terms of performance is achieved and other antennas are omitted. The omitted antennas do not contribute as much to performance and mainly create interference for other mobile communication terminals.

It is to be noted that although the method is described above in relation to the first communication terminal, it can be performed for any mobile communication terminal being served by the mobile communication network.

Figure 3B:
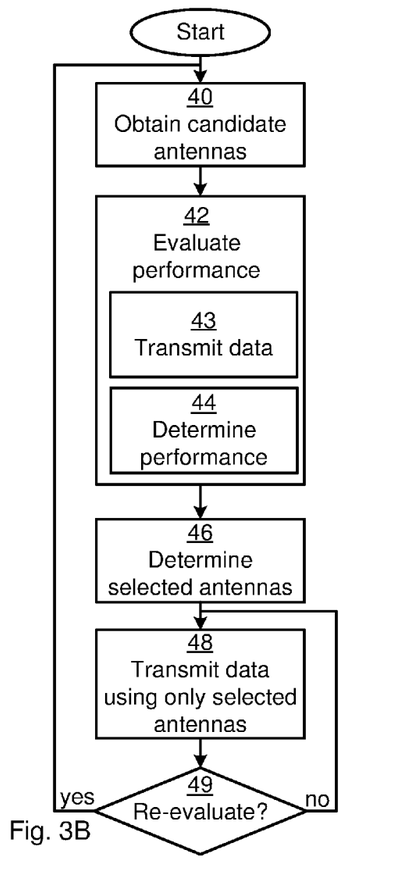

FIG. 3B is a flow chart illustrating an embodiment of a method for obtaining a set of selected antennas in a mobile communication network, such as the mobile communication network for of FIGS. 1A-B. The steps of the method of FIG. 3A have equivalents in FIG. 3B and are only mentioned again when the methods differ in such a step.

The evaluate performance step 42 here comprises a transmit data substep 43 and determine performance substep 44.

In the transmit data substep 43, data is transmitted using an antenna group comprising one or more of the candidate antennas. The antenna group could e.g. be all antennas, one antenna or all but one antenna in the set of candidate antennas. Optionally, the antenna group could be all antennas related to one subcell of a shared cell, or all antennas except a set of antennas related to one subcell of a shared cell.

Each antenna group can optionally consist of the N best antennas or the antennas of the N best subcells in the candidate set, where the process is iterated and N increases or decreases with each iteration. N in this context is a configurable integer. The N best antennas/subcells are then those with the most favourable communication conditions. This can for example be characterized by the highest measured received uplink power, or high performance in previous evaluations of antenna groups where the antenna/subcell has been included.

Optionally, each antenna group can consist of all antennas in the candidate set except the N worst antennas or the antennas of the N worst subcells, where the process is iterated and N increases or decreases with each iteration. N in this context is a configurable integer. The N worst antennas/subcells are those with the least favourable communication conditions. This can for example be characterized by the lowest measured received uplink power, or low performance in previous evaluations of antenna groups where the antenna/subcell has been included.

In some embodiments, not all possible antenna groups of the set of candidate antennas are evaluated at each execution of the evaluate performance step 42. In some embodiments, only a predetermined number of antenna groups are selected. In some embodiments, antenna groups that haven't been evaluated, or for which a long time has passed since the last evaluation, are included in the evaluation in the current execution of the evaluate performance step 42.

In some embodiments, the antenna groups that were evaluated with a low score in a previous execution of the antenna selection algorithm are excluded from evaluation in the current execution. In some embodiments the best antenna group(s) in a previous execution is included in the evaluation in the current execution.

In some embodiments, a higher probability is assigned to choose an antenna group for evaluation when a high score was obtained in a previous evaluation. In some embodiments, a lower probability is assigned to choose an antenna group for evaluation when a low score was obtained in a previous evaluation. In some embodiments, a forgetting factor is used, where old performance scores are weighted down and/or recent performance scores are weighted up. In some embodiments, when no performance scores are available, the different antenna groups are assigned different pre-determined probabilities in being chosen as candidates for evaluation.

In the determine performance substep 44, a performance related to the transmitted data is determined. In other words, in the transmit data substep 43, data is transmitted using one or more antennas and the performance of the one or more antennas is evaluated in the determine performance substep 44, based on the transmitted data.

During and after the data transmission from the antenna group, the effect on the performance of the first mobile communication terminal or the system as a whole and performance is monitored. This can be achieved using any one or a combination of the following determinations:

The number of received ACK (acknowledgements)/NACKs (non-acknowledgements) can be used to calculate a Block Error Rate (BLER) by dividing the number of NACKs by the number of transmissions. This BLER estimate can be the performance score of the antenna group being evaluated, or the difference between this value and the BLER measured for other antenna groups can be compared to some threshold to determine the performance score of this antenna group.

In one embodiment, as soon as a predetermined number of consecutive NACKs have been received within a certain time window this antenna group is given a low score, and the data transmission continues with the previously used antenna group. In other words, the set of selected antennas is then determined to be the same as the last determined set of selected antennas. If, on the other hand, a predetermined number of consecutive ACKs are received within a certain time window, this antenna group is given a high score.

In one embodiment, the performance of other mobile communication terminals in the system is measured and used to determine the score of the antenna group. The performance of other mobile communication terminals can be measured in terms of BLER of their transmissions, the throughput of their data transmissions, etc. For example, if the total data throughput in the cell increases with the new antenna group, then the antenna group is given a high performance score.

In one embodiment, the system performance as well as mobile communication terminal performance is considered in the evaluation. For example, the antenna group is given a high score if the data throughput in the cell increases, while the mobile communication terminal performance remains on the same level, or is just somewhat decreased, for example as indicated by a small increase in BLER.

Optionally, other metrics based on system and/or mobile communication terminal performance can also be used to evaluate the antenna group, such as network and/or mobile communication terminal power consumption and hardware resource utilization.

The two substeps 43, 44 may optionally be repeated for more antenna groups of candidate antennas which are to be evaluated.

Here now follows an illustrative example how antenna groups could be selected and evaluated. With reference to FIG. 1A, antennas 1 and 2 are belong to the first radio base station 1a and relate to the first larger subcell 6a, antennas 3 and 4 belong to the second radio base station 1b and relate to the second smaller subcell 6b, and antennas 5 and 6 belong to the third radio base station 1c and relate to the third smaller subcell 6c.

This example then comprises the following evaluations of antenna groups:

A. Transmit using an antenna group comprising all antennas 1-6 (all subcells) and determine performance B. Transmit using an antenna group comprising antennas 1-4 (the first and second subcells 6a-b) and determine performance C. Transmit using an antenna group comprising antennas 1, 2, 5 and 6 (the first and third subcells 6a, 6c) and determine performance D. Transmit using an antenna group comprising antennas 1 and 2 (only the first subcell 6a) and determine performance E. Transmit using an antenna group comprising antennas 3 and 4 (only the second subcell 6b) and determine performance F. Transmit using an antenna group comprising antennas 5 and 6 (only the third subcell 6c) and determine performance G. Select the best antenna group based on the determined performance of all the tested antenna groups In a transmit data only using selected antennas step 48, further transmissions to the first mobile communication terminal are performed only using the antennas which are part of the set of selected antennas.

In a conditional re-evaluate step 49, it is determined whether the set of selected antennas need to be updated. This may e.g. be due to low performance reported from the first mobile communication terminal, that a certain amount of time has expired since the last evaluation or that channel conditions have changed.

If the re-evaluation is determined, the method starts again, otherwise the method returns to the transmit data only using selected antennas step 48.

Figure 4:
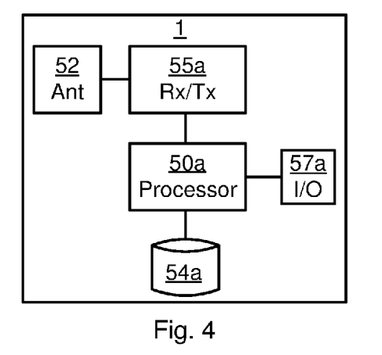
FIG. 4 is a schematic diagram showing some components of the radio base station of FIGS. 1A-B.

FIG. 4 is a schematic diagram showing some components of a radio base station such as the radio base stations 1a-c of FIGS. 1A-B. A processor 50a is provided using any combination of one or more of a suitable central processing unit (CPU), multiprocessor, microcontroller, digital signal processor (DSP), application specific integrated circuit etc., capable of executing software instructions stored in a computer program product 54a, e.g. in the form of a memory. The processor 50a can be configured to execute the method described with reference to FIGS. 3A-B above.

The computer program product 54a can be a memory or any combination of read and write memory (RAM) and read only memory (ROM). The memory also comprises persistent storage, which, for example, can be any single one or combination of magnetic memory, optical memory, solid state memory or even remotely mounted memory.

The radio base station 1 further comprises an I/O interface 57a for communicating with the core network and optionally with other radio base stations.

The radio base station 1 also comprises one or more transceivers 55a, comprising analogue and digital components, and a suitable number of antennas 52 for radio communication with mobile communication terminals within one or more radio cells, optionally using remote radio units as shown in FIG. 2A above and/or sectors as shown in FIG. 2B above. The processor 50a controls the general operation of the radio base station, e.g. by sending control signals to the transceiver 55a and receiving reports from the transceiver 55a of its operation. In one embodiment, the I/O interface 57a is directly connected to the transceiver 55a, whereby data to and from the core network is directly routed between the I/O interface 57a and the transceiver 55a.

Other components of the radio base station are omitted in order not to obscure the concepts presented herein.

Figure 5:
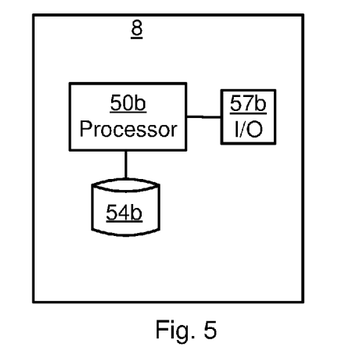
FIG. 5 Fig is a schematic diagram showing some components of the radio network controller of FIGS. 1A-B.

FIG. 5 is a schematic diagram showing some components of the radio network controller 8 of FIGS. 1A-B. A processor 5ob is provided using any combination of one or more of a suitable central processing unit (CPU), multiprocessor, microcontroller, digital signal processor (DSP), application specific integrated circuit etc., capable of executing software instructions stored in a computer program product 54b, e.g. in the form of a memory. The processor 5ob can be configured to execute the method described with reference to FIGS. 3A-B above.

The computer program product 54b can be a memory or any combination of read and write memory (RAM) and read only memory (ROM). The memory also comprises persistent storage, which, for example, can be any single one or combination of magnetic memory, optical memory, solid state memory or even remotely mounted memory.

The radio network controller 8 further comprises an I/O interface 57b for communicating with radio base stations and the core network. The I/O interface 57b is configured to relay data to and from the radio base stations and core network. The processor 5ob controls the general operation of the radio network controller 8, e.g. by sending control signals to the I/O interface 57b and receiving reports from the I/O interface 57b of its operation.

Other components of the radio network controller 8 are omitted in order not to obscure the concepts presented herein.

Figure 6:
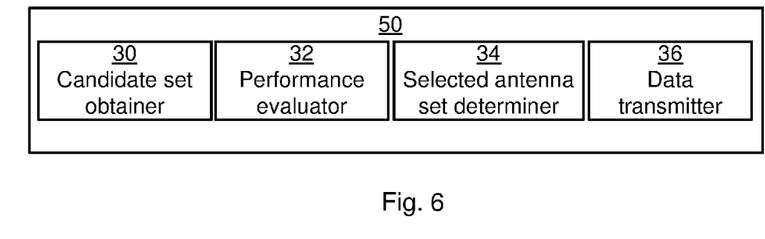
FIG. 6 is a schematic diagram showing functional modules of a processor of either one of FIG. 4 or 5.

FIG. 6 is a schematic diagram showing functional modules of a processor 50. The processor 50 corresponds to the processor 50a of the radio base station of FIG. 4 e.g. in a situation as shown in FIG. 1B, or the processor 50b of FIG. 5 e.g. in a situation as shown in FIG. 1A. The modules can be implemented using software such as a computer program executing in the processor 50. Optionally, one or more of the modules are implemented using hardware or a combination of hardware and software. The modules correspond to the methods as described with reference to FIGS. 3A-B above.

A candidate set obtainer 30 is arranged to obtain a set of candidate antennas wherein each one of the candidate antennas is arranged to send out a pilot signal comprising the same cell identifier, and at least some of the candidate antennas have different coverage areas. This module corresponds to the obtain candidate antennas step 4o of FIGS. 3A-B.

A performance evaluator 32 is arranged to evaluate performance of at least a subset of the candidate antennas in relation to the first mobile communication terminal. This module corresponds to the evaluate performance step 42 of FIGS. 3A-B.

A selected antenna set determiner 34 is arranged to determine a set of selected antennas based on the performance of the candidate antennas having been evaluated. This module corresponds to the determine selected antennas step 46 of FIGS. 3A-B.

An optional data transmitter 36 is arranged to transmit data to the first mobile communication terminal using only the selected set of antennas. This module corresponds to the transmit data only using selected antennas step of FIG. 3B.

Figure 7:
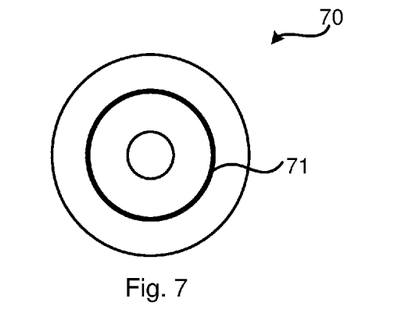
FIG. 7 shows one example of a computer program product comprising computer readable means.

FIG. 7 shows one example of a computer program product 70 comprising computer readable means. On this computer readable means, a computer program 71 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 54a of FIG. 4, the computer program product 54b of FIG. 5 or in an external memory such as a USB (Universal Serial Bus) memory. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for obtaining a set of selected antennas in a mobile communication network, wherein each one of the selected antennas is intended to be used in data transmissions to a first mobile communication terminal, the method being performed in a network node of the mobile communication network and comprising:
    obtaining a set of candidate antennas, wherein each one of the candidate antennas is arranged to send out the same cell identifier and at least some of the candidate antennas have different coverage areas;
    evaluating performance of at least a subset of the candidate antennas in relation to the first mobile communication terminal; and
    determining a set of selected antennas based on the performance of the candidate antennas having been evaluated;
    wherein the evaluating performance comprises, for antenna groups each comprising one or more of the candidate antennas;
    transmitting data using the respective candidate antennas of the antenna group, for one antenna group at a time; and
    determining a performance related to the transmitted data by evaluating acknowledgement or non-acknowledgement signals, related to the transmitted data, received from the first mobile communication terminal,
    wherein the obtaining the set of candidate antennas comprises selecting one or more antennas receiving an uplink signal from the first mobile communication terminal, responsive to the uplink signal having a received signal power relative to a threshold value.

2. The method according to claim 1, wherein in the obtaining a set of candidate antennas, at least some of the candidate antennas are located at different sites.

3. The method according to claim 1, wherein the candidate antennas are part of a shared cell comprising a subcell of a first type and subcells of a second type, wherein a coverage of at least one subcell of the second type is completely included in a coverage of the sub cell of the first type.

4. The method according to claim 3, wherein the subcell of the first type is a macro cell and the subcells of the second type are pico cells.

5. The method according to claim 3, wherein the obtaining a set of candidate antennas comprises including antennas of a first type of subcell having coverage including the first mobile communication terminal.

6. The method according to claim 3, wherein in the determining, the set of selected antennas always contains antennas associated with the subcell of the first type, when the subcell of the first type has a coverage which includes the first mobile communication terminal.

7. The method according to claim 1, wherein the evaluating performance comprises calculating a block error rate using the acknowledgement or non-acknowledgement signals.

8. The method according to claim 1, wherein the evaluating performance comprises determining a low performance when a number of non-acknowledgements are received, and determining a high performance when a number of acknowledgements are received.

9. The method according to claim 1, wherein the evaluating performance comprises evaluating a performance of other mobile communication terminals.

10. The method according to claim 1, wherein the evaluating performance comprises evaluating performance of all of the candidate antennas.

11. The method according to claim 1, wherein the obtaining a set of candidate antennas comprises determining a location of the first mobile communication terminal and selecting candidate antennas based on the location of the antennas in relation to the location of the first mobile communication terminal.

12. The method according to claim 1, wherein the set of selected antennas is a strict subset of the set of candidate antennas.

13. The method according to claim 1, further comprising:
transmitting data to the first mobile communication terminal using only the selected set of antennas.

14. A network node for obtaining a set of selected antennas in a mobile communication network, wherein each one of the selected antennas are intended to be used in data transmissions to a first mobile communication terminal, the network node comprising:
a candidate set obtainer arranged to obtain a set of candidate antennas wherein each one of the candidate antennas is arranged to send out the same cell identifier and at least some of the candidate antennas have different coverage areas;
a performance evaluator arranged to evaluate performance of at least a subset of the candidate antennas in relation to the first mobile communication terminal; and
a selected antenna set determiner arranged to determine a set of selected antennas based on the performance of the candidate antennas having been evaluated,
wherein the performance evaluator, for antenna groups each comprising one or more of the candidate antennas, is further arranged to:
transmit data using the respective candidate antennas of the antenna group, for one antenna group at a time; and
determine a performance related to the transmitted data by evaluating acknowledgement or non-acknowledgement signals, related to the transmitted data, received from the first mobile communication terminal,
wherein the candidate set obtainer is arranged to select one or more antennas receiving an uplink signal from the first mobile communication terminal, responsive to the uplink signal having a received signal power relative to a threshold value.

15. The network node according to claim 14, wherein the candidate set obtainer is arranged to obtain a set of candidate antennas of which at least some are located at different sites.

16. The network node according to claim 14, wherein the candidate antennas are part of a shared cell comprising a subcell of a first type and subcells of a second type, wherein a coverage of at least one subcell of the second type is completely included in a coverage of the subcell of the first type.

17. The network node according to claim 14, wherein the network node is a radio base station.

18. The network node according to claim 14, wherein the network node is a radio network controller.

19. A computer program product for obtaining a set of selected antennas in a mobile communication network, wherein each one of the selected antennas is intended to be used in data transmissions to a first mobile communication terminal, the computer program product comprising a non-transitory computer readable memory comprising computer program code which, when run on a network node, causes the network node to perform operations comprising:
obtaining a set of candidate antennas, wherein each one of the candidate antennas is arranged to send out the same cell identifier and at least some of the candidate antennas have different coverage areas;
evaluating performance of at least a subset of the candidate antennas in relation to the first mobile communication terminal; and
determining a set of selected antennas based on the performance of the candidate antennas having been evaluated,
wherein the evaluating performance comprises, for antenna groups each comprising one or more of the candidate antennas:
transmitting data using the respective candidate antennas of the antenna group, for one antenna group at a time; and
determining a performance related to the transmitted data by evaluating any acknowledgement or non-acknowledgement signals, related to the transmitted data, received from the first mobile communication terminal,
wherein the obtaining a set of candidate antennas comprises selecting one or more antennas receiving an uplink signal from the first mobile communication terminal, responsive to the uplink signal having a received signal power relative to a threshold value.

* * * * *